US011564116B2

(12) United States Patent
Guo et al.

(10) Patent No.: US 11,564,116 B2
(45) Date of Patent: Jan. 24, 2023

(54) ASYNCHRONOUS OBSERVATION MATCHING FOR OBJECT LOCALIZATION IN CONNECTED VEHICLES

(71) Applicant: Toyota Motor Engineering & Manufacturing North America, Inc., Plano, TX (US)

(72) Inventors: Rui Guo, Mountain View, CA (US); Hongsheng Lu, Mountain View, CA (US); Peng Gao, Mountain View, CA (US)

( * ) Notice: Subject to any disclaimer, the term of this patent is extended or adjusted under 35 U.S.C. 154(b) by 429 days.

(21) Appl. No.: 16/886,560

(22) Filed: May 28, 2020

(65) Prior Publication Data
US 2021/0377760 A1 Dec. 2, 2021

(51) Int. Cl.
*H04W 4/029* (2018.01)
*H04W 4/40* (2018.01)
*H04W 24/08* (2009.01)

(52) U.S. Cl.
CPC ........... *H04W 24/08* (2013.01); *H04W 4/029* (2018.02); *H04W 4/40* (2018.02)

(58) Field of Classification Search
CPC ........ H04W 4/029; H04W 4/40; H04W 24/08
See application file for complete search history.

(56) References Cited

U.S. PATENT DOCUMENTS

| 6,675,094 | B2 | 1/2004 | Russell et al. |
| 2020/0026722 | A1 | 1/2020 | Eade et al. |
| 2020/0255027 | A1* | 8/2020 | Kulkarni ............ G01C 21/3602 |

OTHER PUBLICATIONS

Hu et al., "Joint Monocular 3D Vehicle Detection and Tracking," 2019 IEEE/CVF International Conference on Computer Vision (ICCV), 2019, pp. 5389-5398, doi: 10.1109/ICCV.2019.00549. (Year: 2019).*
Leon, et al., A Review of Tracking, Prediction and Decision Making Methods for Autonomous Driving, arXiv preprint, 2019, 36 pages.
Houenou, et al., "Vehicle trajectory prediction based on motion model and maneuver recognition," 2013 IEEE/RSJ International Conference on Intelligent Robots and Systems, Nov. 2013, pp. 4363-4369.

* cited by examiner

*Primary Examiner* — Brian P Cox
(74) *Attorney, Agent, or Firm* — Burbage Law, P.C.; Jon-Michael Burbage

(57) ABSTRACT

The disclosure includes embodiments for asynchronous observation matching for object localization in connected vehicles. A method includes receiving a wireless message from the remote connected vehicle. The wireless message includes first observation data recorded by the remote connected vehicle and describing sensor measurements of the remote connected vehicle at a first time but not a second time. The method includes analyzing a set of vectors describing how a known object moves within a two-dimensional space to determine a two-dimensional flow of the known object in the two-dimensional space during a timespan. The method includes analyzing the two-dimensional flow of the object to infer a three-dimensional flow of the object in a three-dimensional space during the timespan. The method includes estimating second observation data recoded by the remote connected vehicle at the second time so that the impact of the latency is modified.

20 Claims, 5 Drawing Sheets

ASYNCHRONOUS OBSERVATION MATCHING FOR OBJECT LOCALIZATION IN CONNECTED VEHICLES

BACKGROUND

The specification relates to asynchronous observation matching for object localization in connected vehicles.

Modern vehicles include Adaptive Driver Assistance Systems (herein "ADAS systems") or automated driving systems. An automated driving system is a collection of ADAS systems which provides sufficient driver assistance that a vehicle is autonomous. ADAS systems and automated driving systems are referred to as "vehicle control systems." An example of a vehicle control system according to some embodiments includes the vehicle control system 151 depicted in FIG. 2. For example, the vehicle control system 151 includes an ADAS system or an autonomous driving system (e.g., a collection of ADAS systems).

A particular vehicle that includes these vehicle control systems is referred to herein as an "ego vehicle" and other vehicles in the vicinity of the ego vehicle are referred to as "remote vehicles."

Modern vehicles collect a lot of data describing their environment, in particular image data. An ego vehicle uses this image data to understand their environment and operate their vehicle control systems (e.g., ADAS systems or automated driving systems).

Connected vehicles form clusters of interconnected vehicles (e.g., via vehicle-to-everything, i.e., "V2X") that are located at a similar geographic location. Such clusters are known as "vehicular micro clouds."

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for modifying an impact of latency in wireless communications between an ego connected vehicle and a remote connected vehicle, the method executed by the ego connected vehicle and including: receiving a wireless message from the remote connected vehicle, where the wireless message includes first observation data recorded by the remote connected vehicle and describing sensor measurements of the remote connected vehicle at a first time but not a second time; analyzing a set of vectors describing how a known object moves within a two-dimensional space to determine a two-dimensional flow of the known object in the two-dimensional space during a timespan from the first time to the second time, where the set of vectors is determined based on the observation data of the remote connected vehicle from the first time and sensor measurements of the ego connected vehicle at the first time and the second time; analyzing the two-dimensional flow of the object to infer a three-dimensional flow of the object in a three-dimensional space during the timespan; and estimating, based on the three-dimensional flow of the object in the three-dimensional space, second observation data recoded by the remote connected vehicle at the second time, where the estimate occurs prior to receipt of the second observation data from the remote connected vehicle by the ego connected vehicle due to latency so that the impact of the latency is modified. Other embodiments of this aspect include corresponding computer systems, apparatus, and computer programs recorded on one or more computer storage devices, each configured to perform the actions of the methods.

Implementations may include one or more of the following features. The method where the set of vectors are represented by a set of hypergraphs. The method where the three-dimensional space is real-world. The method where the real-world includes the ego connected vehicle, the remote connected vehicle, and the object. The method where the wireless message is a cellular-vehicle-to-everything message. The method further including determining a location of the object in the three-dimensional space based on the second observation data which is estimated and the sensor measurements of the ego vehicle at the second time. The method where the location is accurate to within plus or minus three meters relative to an actual location of the object in the three-dimensional space. The method where the ego vehicle is a hub vehicle of a vehicular micro cloud and the method improves the impact of latency among the wireless communications among members of the vehicular micro cloud. The method where the hub vehicle controls membership in the vehicular micro cloud and can instruct the members when to join and when to leave the vehicular micro cloud. Implementations of the described techniques may include hardware, a method or process, or computer software on a computer-accessible medium.

One general aspect includes a computer program product included in an onboard vehicle computer of an ego connected vehicle for modifying an impact of latency in wireless communications between the ego connected vehicle and a remote connected vehicle, the computer program product including computer code that is operable, when executed by the onboard computer, to cause the onboard computer to execute steps including: receiving a wireless message from the remote connected vehicle, where the wireless message includes first observation data recorded by the remote connected vehicle and describing sensor measurements of the remote connected vehicle at a first time but not a second time; analyzing a set of vectors describing how a known object moves within a two-dimensional space to determine a two-dimensional flow of the known object in the two-dimensional space during a timespan from the first time to the second time, where the set of vectors is determined based on the observation data of the remote connected vehicle from the first time and sensor measurements of the ego connected vehicle at the first time and the second time; analyzing the two-dimensional flow of the object to infer a three-dimensional flow of the object in a three-dimensional space during the timespan; and estimating, based on the three-dimensional flow of the object in the three-dimensional space, second observation data recoded by the remote connected vehicle at the second time, where the estimate occurs prior to receipt of the second observation data from the remote connected vehicle by the ego connected vehicle due to latency so that the impact of the latency is modified. Other embodiments of this aspect include corresponding computer systems, apparatus, and computer programs recorded on one or more computer storage devices, each configured to perform the actions of the methods.

Implementations may include one or more of the following features. The computer program product where the set of vectors are represented by a set of hypergraphs. The computer program product where the three-dimensional space is real-world. The computer program product where the real-world includes the ego connected vehicle, the remote connected vehicle, and the object. The computer program product where the wireless message is a cellular-vehicle-to-everything message. Implementations of the described techniques may include hardware, a method or process, or computer software on a computer-accessible medium.

One general aspect includes a system included in an ego connected vehicle for modifying an impact of latency in wireless communications between the ego connected vehicle and a remote connected vehicle, the system including: a processor; a communication unit communicatively coupled to the processor; and a non-transitory memory communicatively coupled to the processor and the communication unit, where the non-transitory memory stores executable code that is operable, when executed by the processor, to cause the processor to: receive a wireless message from the remote connected vehicle, where the wireless message includes first observation data recorded by the remote connected vehicle and describing sensor measurements of the remote connected vehicle at a first time but not a second time; analyze a set of vectors describing how a known object moves within a two-dimensional space to determine a two-dimensional flow of the known object in the two-dimensional space during a timespan from the first time to the second time, where the set of vectors is determined based on the observation data of the remote connected vehicle from the first time and sensor measurements of the ego connected vehicle at the first time and the second time; analyze the two-dimensional flow of the object to generate an inference of a three-dimensional flow of the object in a three-dimensional space during the timespan; and estimate, based on the three-dimensional flow of the object in the three-dimensional space, second observation data recoded by the remote connected vehicle at the second time, where the estimate occurs prior to receipt of the second observation data from the remote connected vehicle by the ego connected vehicle due to latency so that the impact of the latency is modified. Other embodiments of this aspect include corresponding computer systems, apparatus, and computer programs recorded on one or more computer storage devices, each configured to perform the actions of the methods.

Implementations may include one or more of the following features. The system where the wireless message is a cellular-vehicle-to-everything message. The system further including determining a location of the object in the three-dimensional space based on the second observation data which is estimated and the sensor measurements of the ego vehicle at the second time. The system where the location is accurate to within plus or minus three meters relative to an actual location of the object in the three-dimensional space. The system where the ego vehicle is a hub vehicle of a vehicular micro cloud. The system where the executable code is determined based at least in part on a digital twin simulation of the timespan that provides digital data for analyzing the two-dimensional flow of the object to infer the three-dimensional flow of the object in the three-dimensional space during the timespan, where the digital data provides the inference of the three-dimensional flow. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Modern vehicles include ADAS systems or automated driving systems. These systems are referred to herein collectively or individually as "vehicle control systems."

A particular vehicle that includes these vehicle control systems is referred to herein as an "ego vehicle" and other vehicles in the vicinity of the ego vehicle as "remote vehicles."

Modern vehicles collect a lot of data describing their environment, in particular image data. An ego vehicle uses this image data to understand their environment and operate their vehicle control systems (e.g., ADAS systems or automated driving systems).

Other vehicles monitor the environment which the ego vehicle occupies. The other vehicles generate hypergraphs that describe each of the objects they observe and their relative distances from each other; the hypergraphs are described by observation data.

The raw image data generated by vehicles cannot be shared among vehicles because this would result in channel congestion and break the network).

The Latency Problem

An ego vehicle could better understand its environment if the other vehicles shared their observation data with the ego vehicle. However, this is problematic because of the latency that would be required for a remote vehicle to share its observation data with the ego vehicle results in the ego vehicle receiving a remote vehicle's observation data for time t1 when it is already time t2, and the t1 data is not helpful at this point (i.e., time t2) because time t1 is in the past. This problem is referred to herein as "the latency problem."

Described herein are embodiments of a localization system. Embodiments of the localization system solve the latency problem by enabling vehicles to estimate or infer what other vehicles see at a current time t2 based on: (1) what these vehicles have seen and reported to ego vehicle at earlier times as represented by the observation data for an earlier times t1, t0 . . . tn; and (2) an understanding of how the objects included in the hypergraphs for these instances of observation data corresponds to the objects viewed by the ego vehicle s indicated in the ego vehicle's own hypergraphs for times earlier times t1, t0 . . . tn. In general, "n" is any positive number. However, as used herein "n" may be a negative number merely to indicate progressively earlier times in a sequence of time.

Hypergraphs

Figure 4:
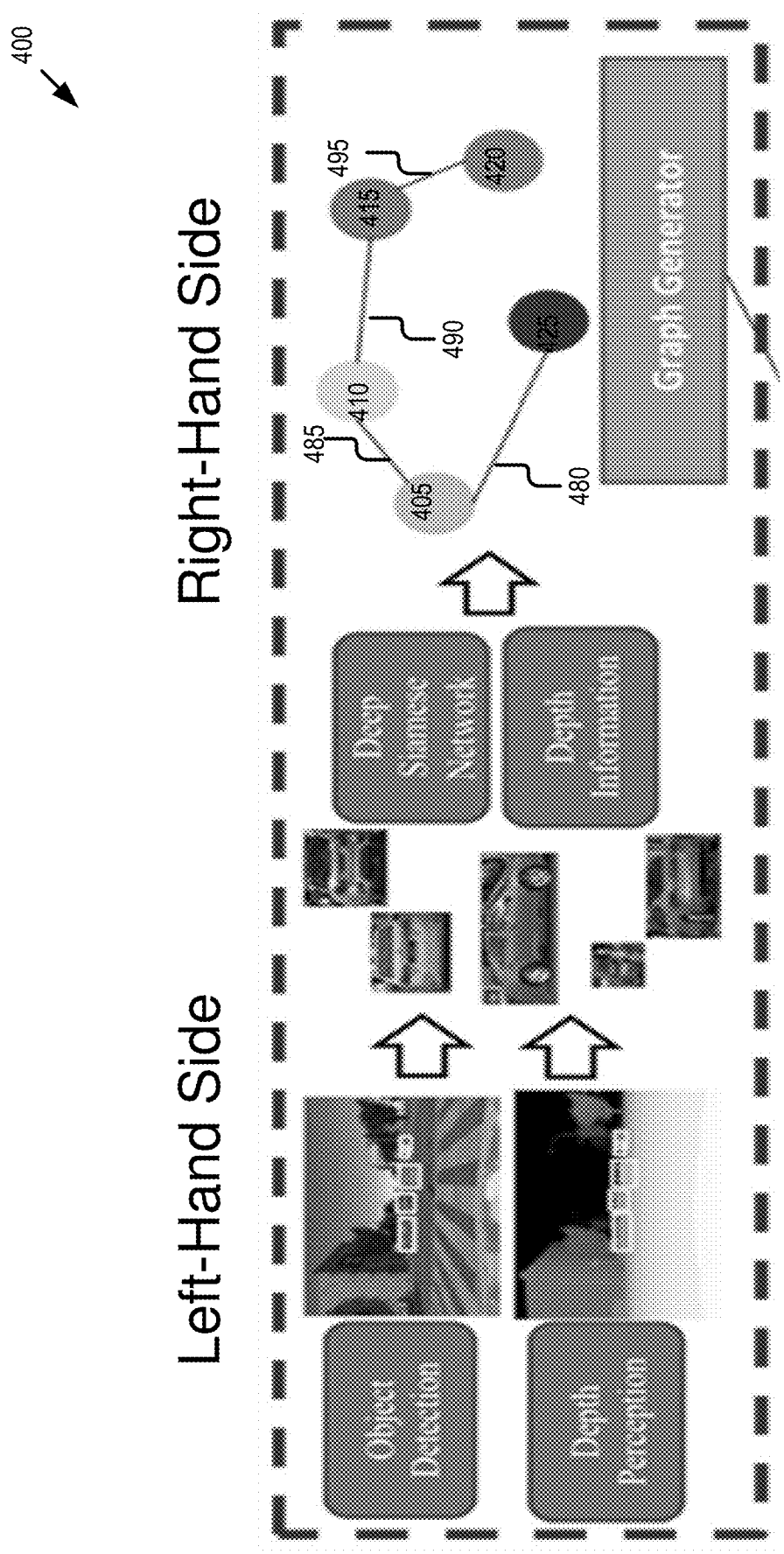
FIG. 4 is a block diagram of an example hypergraph according to some embodiments.

A hypergraph is a graphic representation of an image that essentially compresses an image to nodes and edges. An example of a hypergraph is depicted in FIG. 4. As depicted in FIG. 4, the hypergraph 400 is the circles 405, 410, 415, 420, 425 and lines 480, 485, 490, 495 indicated on the right-hand side. The circles 405, 410, 415, 420, 425 represent objects in an image. The lines 480, 485, 490, 495 are "edges" that represent the relative distance between objects.

Hypergraphs are known in the art. However, sharing hypergraphs (i.e., sharing object data) between vehicles has not be widely adopted because no one has solved the latency problem described above.

Figure 1:
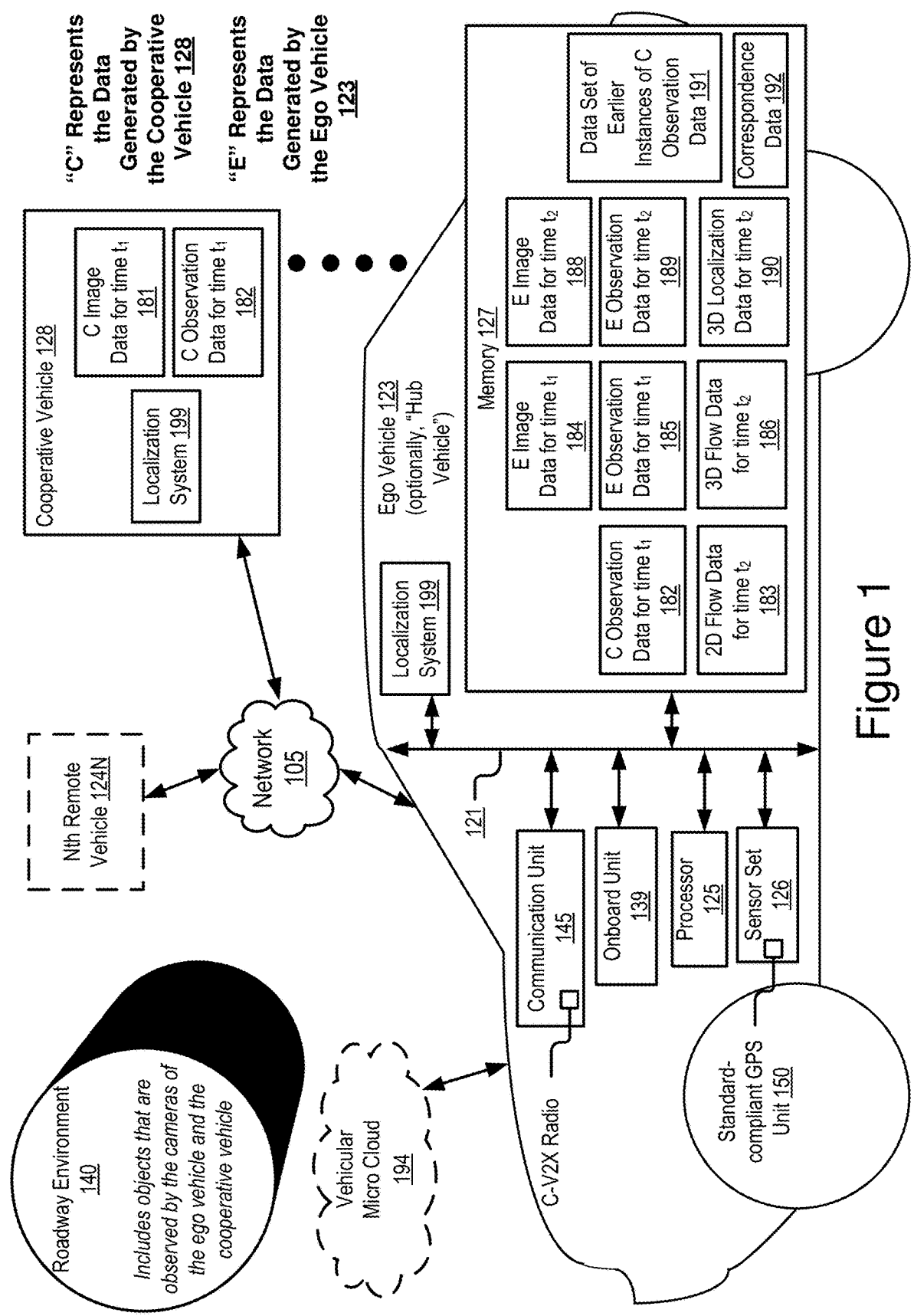
FIG. 1 is a block diagram illustrating an operating environment for a localization system according to some embodiments.

The hypergraph depicted in FIG. 4 is an example of one or more of the following elements depicted in FIG. 1: C observation data for time t1 182; E observation data for time t1 185; E observation data for time t2 189; the data stored in a data set of earlier instances of C observation data 191.

Example General Method

Some example definitions are now provided according to some embodiments. These definitions describe terms that are used in the example general method.

Image data is digital data that describes images that depict a roadway environment. In some embodiments, both the ego vehicle and the cooperative vehicle are located in this environment at about the same time or exactly the same time. The image data includes images of the roadway environment. In some embodiments, the images are raw images.

Observation data is digital data that describes hypergraphs that are compressed versions of the images included in the image data.

In some embodiments, different instances of image data and observation data are generated at different times t1 and t2.

Instances of image data or observation data indicated with a "C" are recorded by the sensor set of a cooperative vehicle.

The sensor set includes, among other sensors, one or more cameras. Instances of image data or observation data indicated with a "E" are recorded by a sensor set of an ego vehicle.

In some embodiments, the localization system includes code and routines that are operable, when executed by the processor, to cause the processor of the ego vehicle to execute the following steps. These steps are described from the perspective of the ego vehicle, but the cooperative vehicle has a localization system that is executing these same steps. In some embodiments, some of these steps are skipped. In some embodiments, the steps are executed in a different order. The steps of the example general method are now described.

Step 1: Cause the sensors of the ego vehicle to record image data for time t1. An example of this digital data according to some embodiments includes the E image data for time t1 184 depicted in FIG. 1.

Step 2: Generate E observation data for time t1. The E observation data is recorded by a sensor set of the ego vehicle. An example of this digital data according to some embodiments includes the E observation data for time t1 185 depicted in FIG. 1.

Step 3: Receive the C observation data for time t1 from the cooperative vehicle at a time t2. The C observation data for time t1 is recorded by the sensor set of the cooperative vehicle and wirelessly transmitted to the ego vehicle via a vehicle-to-everything (V2X) communication. An example of this digital data according to some embodiments includes the C observation data for time t1 182 depicted in FIG. 1.

The C observation data for time t1 is generated by the localization system of the cooperative vehicle based on C image data for time t1. The C image data for time t1 is raw image data recorded by the sensor set of the cooperative vehicle and used by the localization system of the cooperative vehicle to generate the C observation data for time t1. The C image data for time t1 cannot be wirelessly transmitted to the ego vehicle via a V2X communication because doing so would cause channel congestion of the V2X network. The C image data for time t1 includes digital data that describes one or more instances image data recorded by the sensor set of the cooperative vehicle at a time t1. An example of the C image data for time t1 according to some embodiments includes the C image data for time t1 181 depicted in FIG. 1 as an element of the cooperative vehicle 128.

Step 4: Cause the sensors of the ego vehicle to record image data for time t2. An example of this digital data according to some embodiments includes the E image data for time t2 188 depicted in FIG. 1.

Step 5: Generate observation data for time t2. An example of this digital data according to some embodiments includes the E observation data for time t2 189 depicted in FIG. 1.

Step 6: Analyze the E observation data for time t1 (e.g., element 184 in FIG. 1), the C observation data for time t1 (e.g., element 182 in FIG. 1), and the data set of earlier instances of C observation data (e.g., element 191 in FIG. 1) to generate correspondence data. The correspondence data is digital data that describes which objects in the hypergraphs generated by the ego vehicle correspond to the objects in the hypergraphs generated by the cooperative vehicle. An example of the correspondence data according to some embodiments includes the correspondence data 192 depicted in FIG. 1.

The set of earlier instances of C observation data 191 includes digital data (or a data structure including digital data) that describes one or more instances of C observation data for times other than time t1 that were received by the ego vehicle 123 at times prior to time t1.

Step 7: Analyze the correspondence data as well as the E observation data for time t1 (e.g., element 184 in FIG. 1), the C observation data for time t1 (e.g., element 182 in FIG. 1), and the data set including the sequential observation from time t1 to time t2 of E observation data (e.g., the sequence or change of observation data from time t1 to time t2 as determinable by analyzing elements 185 and 189 in FIG. 1) to generate 2D flow data for time t2. The term "sequence" depicted in FIG. 5 refers to this sequential observation which is made by the localization system 199 based on the digital data included in observation data elements such as elements 185 and 189.

The 2D flow data for time t2 is digital data that describes a set of vectors indicating how the known objects move within the hypergraphs, i.e., how the objects move within 2D space. An example of the 2D flow data for time t2 according to some embodiments includes the 2D flow data for time t2 183 depicted in FIG. 1.

Step 8: Based on (1) the flow indicated by the 2D flow data for time t2 and (2) the correspondence indicated by the correspondence data, generate 3D flow data for time t2. The 3D flow data for time t2 is digital data that describes an inference of the flow of the objects in 3D space (see, e.g., the process 500 depicted in FIG. 5). In some embodiments, this inference is a point of novelty because it allows the localization system of the ego vehicle to estimate C observation data at time t2 when the localization system of the ego vehicle has not yet received it (because the localization system of the ego vehicle cannot possibly have received this C observation data at time t2 due to latency associated with V2V communication between the ego vehicle and the cooperative vehicle), thereby overcoming the latency problem described above in the problem statement. An example of the 3D flow data for time t2 according to some embodiments includes the 3D flow data for time t2 186 depicted in FIG. 1.

Figure 5:
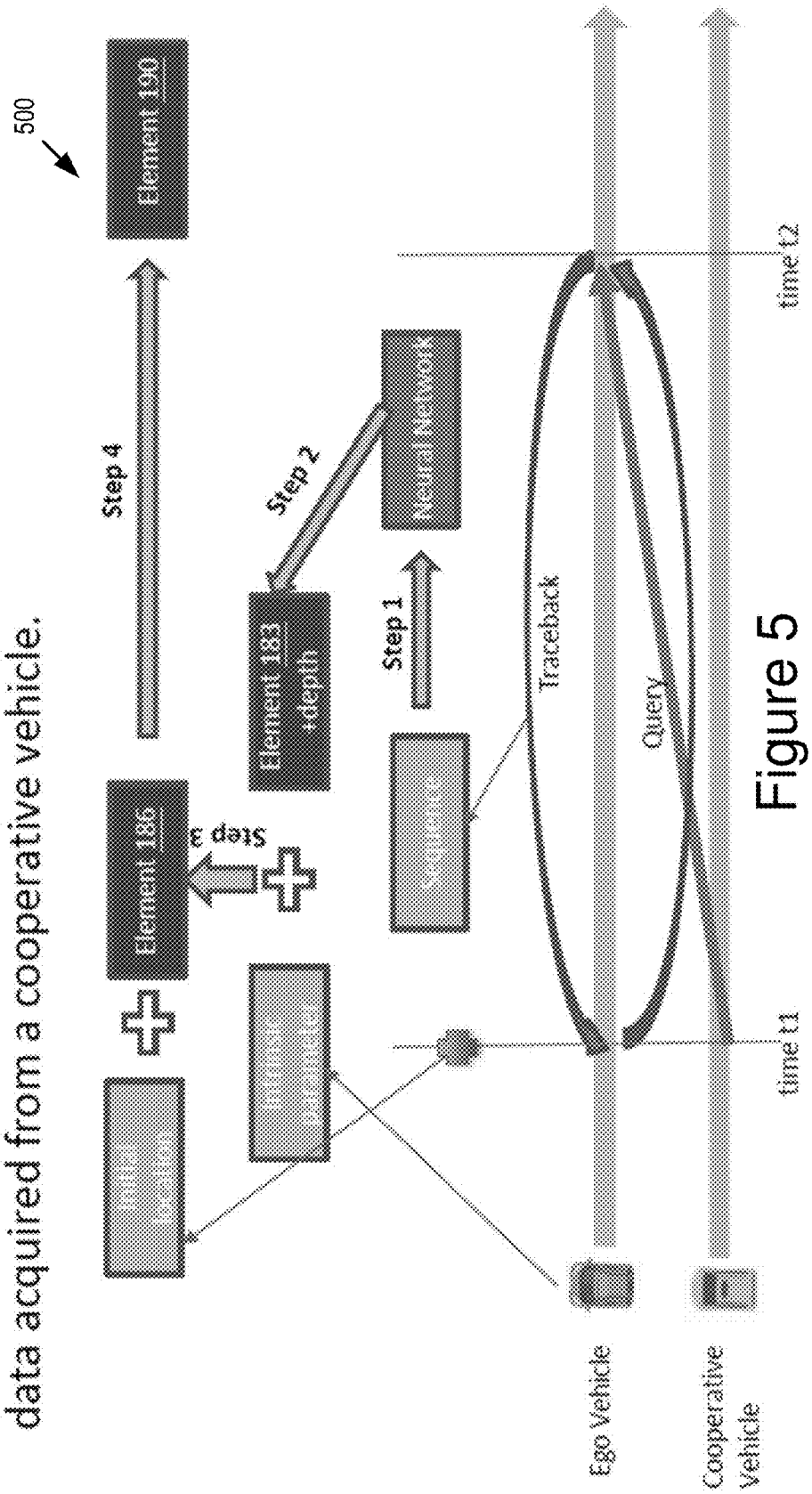
FIG. 5 is a block diagram of an example process for generating 3D localization data according to some embodiments.

As used in FIG. 5, "depth" refers to depth sensor measurements recorded by a sensor set. The term "sequence" depicted in FIG. 5 refers to this sequential observation which is made by the localization system 199 based on the digital data included in observation data elements such as elements 185, 189, and 191. See also step 7 described above regarding this sequential observation. Elements 183, 186, and 190 as used in FIG. 5 refer to the 2D flow data for time t2 183, the E observation data for time t2 189, and the 3D localization data for time t2 190 as depicted in FIG. 1, respectively.

In some embodiments, the inference is made based at least in part on digital twin simulations that provide digital data regarding the inference.

Step 9: Generate 3D localization data for time t2 based on the 3D flow data for time t2. The 3D localization data for time t2 is digital data that describes the precise location of each of the objects described by the correspondence data; this is generated by the localization system based at least in part on the 3D flow data for time t2. In some embodiments, the description of the location is described with lane-level accuracy. An example of the 3D localization data for time t2 according to some includes the 3D localization data for time t2 190 depicted in FIG. 1.

The prior art does not disclose or suggest a cooperative vehicle that helps an ego vehicle to determine its future location by transmitting a cooperative hypergraph describing the motion of the cooperative vehicle at a first time.

The prior art does not disclose or suggest the ego vehicle, operating in an environment that includes the cooperative vehicle and potentially numerous other vehicles, generating its own ego hypergraph describing any objects in its own environment at the first time and then analyzing the ego hypergraph and the cooperative hypergraph to determine which vehicle in the ego hypergraph corresponds to the cooperative vehicle described by the cooperative hypergraph to thereby generate correspondence data.

The prior art does not disclose or suggest the ego vehicle generating, based on (1) the flow indicated by the 2D flow data and (2) the correspondence indicated by the correspondence data, 3D flow data that describes an inference of the flow of the objects in 3D space. In some embodiments, this step occurs before the ego vehicle has received any cooperative hypergraphs from the cooperative vehicle describing information about the cooperative vehicle at a second time.

The prior at does not disclose or suggest the ego vehicle estimating the geographic location of the cooperative vehicle at the second time based on the 3D flow data. In some embodiments, this step occurs before the ego vehicle has received any cooperative hypergraphs from the cooperative vehicle describing information about the cooperative vehicle at a second time so that the ego vehicle is able to estimate the future location of the ego vehicle at the second time and thereby solve the latency problem described above.

Vehicle Cloudification

Some of the embodiments described herein are motivated by the emerging concept of "vehicle cloudification." Vehicle cloudification means that vehicles equipped with on-board computer unit(s) and wireless communication functionalities form a cluster, called a vehicular micro cloud, and collaborate with other micro cloud members over V2V networks or V2X networks to perform computation, data storage, and data communication tasks in an efficient way. These types of tasks are referred to herein as "computational tasks."

Vehicular micro clouds are beneficial, for example, because they help vehicles to perform computationally expensive tasks that they could not perform alone or store large data sets that they could not store alone. The members that form a vehicular micro cloud may execute computing processes (e.g., such as those depicted in FIG. 3 or the example general methods described above) together in parallel by a cooperative process. A "cooperative process" is sometimes referred to herein as a "collaborative computing process," a "method for collaborative computing," or some other reference to "collaborative computing." Individual steps of the computing processes may be executed by one or more vehicles in a collaborative fashion. The cooperative process may include the members exchanging V2X communications with one another that communicate outputs of their computations or digital data that may be beneficial to other members.

Vehicular micro clouds are described in the patent applications that are incorporated by reference in this paragraph. This patent application is related to the following patent applications, the entirety of each of which is incorporated herein by reference: U.S. patent application Ser. No. 15/358,567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; and U.S. patent application Ser. No. 15/799,963 filed on Oct. 31, 2017 and entitled "Identifying a Geographic Location for a Stationary Micro-Vehicular Cloud."

A typical use case of vehicular micro clouds is a data storage service, where vehicles in a micro cloud collaboratively keep data contents in their on-board data storage device. The vehicular micro cloud allows vehicles in and around the vehicular micro cloud to request the data contents from micro cloud member(s) over V2V communications, reducing the need to access remote cloud servers by vehicle-to-network (e.g., cellular) communications. For some use cases, micro cloud members may also update the cached data contents on the spot with minimal intervention by remote cloud/edge servers (e.g., updating a high-definition road map based on measurements from on-board sensors).

The endpoints that are part of the vehicular micro cloud may be referred to herein as "members," "micro cloud members," or "member vehicles." Examples of members include one or more of the following: a connected vehicle; an edge server; a cloud server; any other connected device that has computing resources and has been invited to join the vehicular micro cloud by a handshake process. In some embodiments, the term "member vehicle" specifically refers to only connected vehicles that are members of the vehicular micro cloud whereas the terms "members" or "micro cloud members" is a broader term that may refer to one or more of the following: endpoints that are vehicles; and endpoints that are not vehicles such as roadside units.

Vehicular micro clouds are not an essential part of the embodiments described herein. Some embodiments do not include a vehicular micro cloud.

In some embodiments, the communication unit of an ego vehicle includes a V2X radio. The V2X radio operates in compliance with a V2X protocol. In some embodiments, the V2X radio broadcasts Basic Safety Messages ("BSM" or "safety message" if singular, "BSMs" or "safety messages" if plural). In some embodiments, the safety messages broadcast by the communication unit include some or all of the system data as its payload. In some embodiments, the system data is included in part 2 of the safety message as specified by the Dedicated Short-Range Communication (DSRC) protocol.

In some embodiments, the pedestrian data is digital data that describes, among other things, images of a roadway environment as captured by the camera of the pedestrian device.

As used herein, the term "vehicle" refers to a connected vehicle. For example, the ego vehicle and remote vehicle depicted in FIG. 1 are connected vehicles. A connected vehicle is a conveyance, such as an automobile, that includes a communication unit that enables the conveyance to send and receive wireless messages via one or more vehicular networks. Accordingly, as used herein, the terms "vehicle" and "connected vehicle" may be used interchangeably. The embodiments described herein are beneficial for both drivers of human-driven vehicles as well as the autonomous driving systems of autonomous vehicles.

In some embodiments, the localization system improves the performance of a network because it beneficially takes steps to reduce or eliminate the latency problem described above.

In some embodiments, the localization system is software installed in an onboard unit (e.g., an electronic control unit (ECU)) of a vehicle having V2X communication capability. The vehicle is a connected vehicle and operates in a roadway environment with N number of remote vehicles that are also connected vehicles, where N is any positive whole number that is sufficient to satisfy a threshold for forming a vehicular micro cloud. In some embodiments, one or more of these vehicles is a cooperative vehicle. A cooperative vehicle is a remote vehicle that also includes an instance of the localization system and cooperates with the localization system of the ego vehicle. The roadway environment may include one or more of the following example elements: an ego vehicle; N remote vehicles; a cooperative vehicle; an edge server; a roadside unit; and a pedestrian. For the purpose of clarity, the N remote vehicles may be referred to herein as the "remote vehicle" or the "remote vehicles" and this will be understood to describe N remote vehicles.

An example of a roadway environment according to some embodiments includes the roadway environment 140 depicted in FIG. 1. As depicted, the roadway environment 140 includes objects that are observed by the cameras of the ego vehicle 123 and the cooperative vehicle 128. In some embodiments, the roadway environment 140 includes objects that are observed by the cameras of one or more remote vehicles 124. An object is observed by a camera when the camera records sensor data describing the object (e.g., an image of the object). Examples of objects include one or of the following: other automobiles, signs, traffic signals, roadway paint, medians, turns, intersections, animals, pedestrians, debris, potholes, accumulated water, accumulated mud, gravel, roadway construction, cones, bus stops, poles, entrance ramps, exit ramps, breakdown lanes, merging lanes, other lanes, railroad tracks, railroad crossings, and any other tangible object that is present in a roadway environment 140 or otherwise observable or measurable by a camera or some other sensor.

The ego vehicle, the remote vehicles, and the cooperative vehicles may be human-driven vehicles, autonomous vehicles, or a combination of human-driven vehicles and autonomous vehicles. In some embodiments, the ego vehicle, the remote vehicles, and the cooperative vehicle may be equipped with DSRC equipment such as a GPS unit that has lane-level accuracy and a DSRC radio that is capable of transmitting DSRC messages.

In some embodiments, the ego vehicle and some or all of the remote vehicles include their own instance of a localization system. For example, in addition to the ego vehicle, some or all of the remote vehicles include an onboard unit having an instance of the localization system installed therein. The cooperative vehicle includes an instance of the localization system.

Accordingly, multiple instances of the localization system are installed in a group of connected vehicles. The group of connected vehicles may be arranged as a vehicular micro cloud or some other vehicular cloud. In some embodiments, the ego vehicle, the cooperative vehicle, and one or more of the remote vehicles are members of a vehicular micro cloud. In some embodiments, the remote vehicles are members of a vehicular micro cloud, but the ego vehicle is not a member of the vehicular micro cloud. In some embodiments, the ego vehicle and some, but not all, of the remote vehicles are members of the vehicular micro cloud. In some embodiments, the ego vehicle and some or all of the remote vehicles are members of the same vehicular macro cloud, meaning that they are members of various vehicular micro clouds that are all members of the same vehicular macro cloud so that they are still interrelated to one another and operable to execute a collaborative computing process.

An example of a vehicular micro cloud according to some embodiments includes the vehicular micro cloud 194 depicted in FIG. 1.

Hub Vehicle

Figure 3:
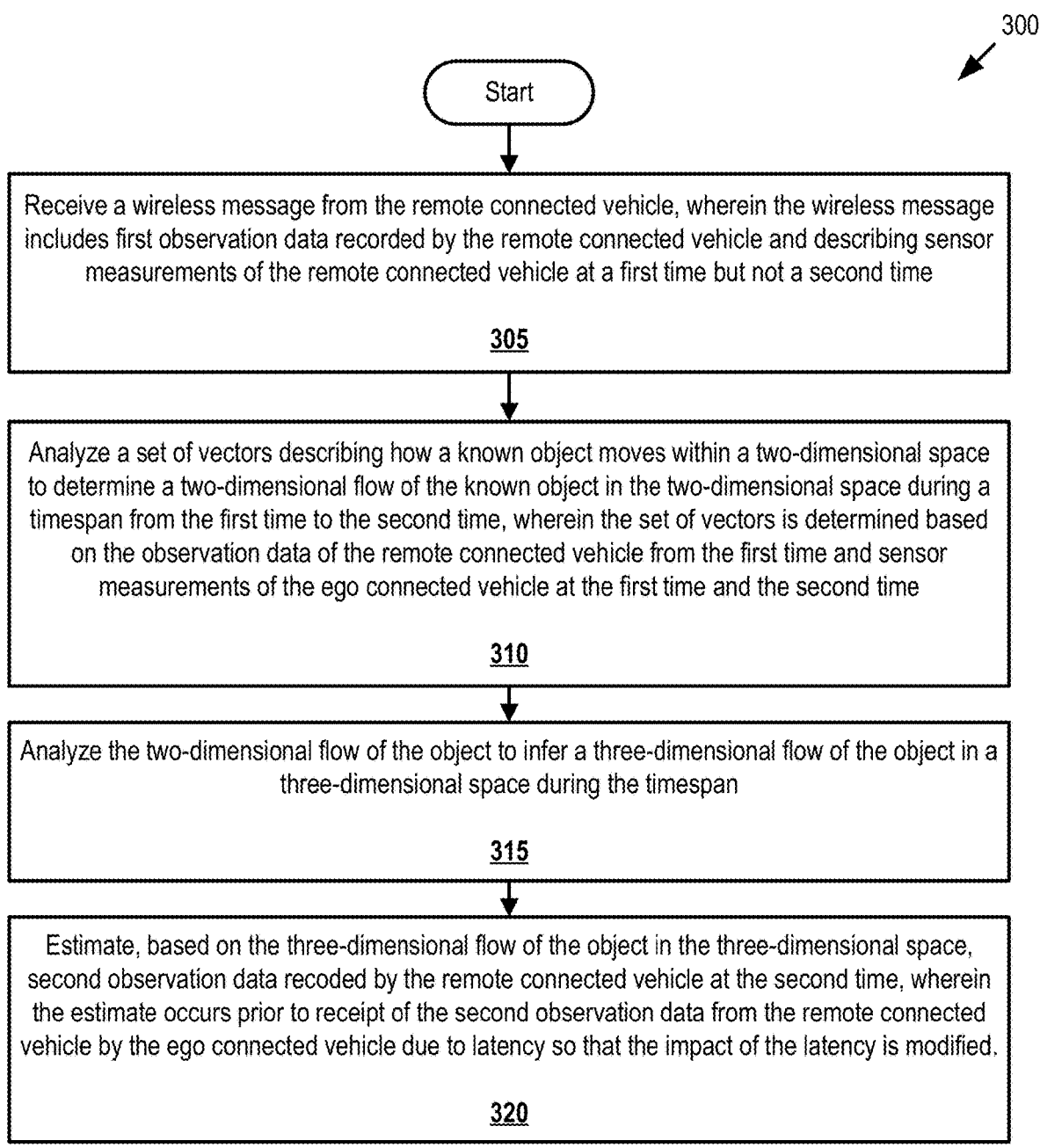
FIG. 3 is a flowchart of an example method for providing asynchronous observation matching for object localization in connected vehicles according to some embodiments.

In some embodiments, a method executed by the localization system (e.g., the example general method described above, or some other method such as the method 300 depicted in FIG. 3) is an element of a hub vehicle. For example, the vehicular micro cloud formed by the localization system includes a hub vehicle that provides the following example functionality in addition to the functionality of the methods described herein: (1) controlling when the set of member vehicles leave the vehicular micro cloud (i.e., managing the membership of the vehicular micro cloud, such as who can join, when they can join, when they can leave, etc.); (2) determining how to use the pool of vehicular computing resources to complete a set of tasks in an order for the set of member vehicles wherein the order is determined based on a set of factors that includes safety; (3) determining how to use the pool of vehicular computing resources to complete a set of tasks that do not include any tasks that benefit the hub vehicle; and determining when no more tasks need to be completed, or when no other member vehicles are present except for the hub vehicle, and taking steps to dissolve the vehicular micro cloud responsive to such determinations.

The "hub vehicle" may be referred to herein as the "hub." An example of a hub vehicle according to some embodiments includes the ego vehicle 123 depicted in FIG. 1.

In some embodiments, the localization system determines which member vehicle from a group of vehicles (e.g., the ego vehicle and one or more remote vehicles) will serve as the hub vehicle based on a set of factors that indicate which vehicle (e.g., the ego vehicle or one of the remote vehicles) is the most technologically sophisticated. For example, the member vehicle that has the fastest onboard computer may be the hub vehicle. Other factors that may qualify a vehicle to be the hub include one or more of the following: having the most accurate sensors relative to the other members;

having the most bandwidth relative to the other members; and having the most memory most unused memory relative to the other members. Accordingly, the designation of which vehicle is the hub vehicle may be based on a set of factors that includes which vehicle has: (1) the fastest onboard computer relative to the other members; (2) the most accurate sensors relative to the other members; (3) the most bandwidth relative to the other members or other network factors such having radios compliant with the most modern network protocols; and (4) most available memory relative to the other members.

In some embodiments, the designation of which vehicle is the hub vehicle changes over time if a more technologically sophisticated vehicle joins the vehicular micro cloud. Accordingly, the designation of which vehicle is the hub vehicle is dynamic and not static. In other words, in some embodiments the designation of which vehicle from a group of vehicles is the hub vehicle for that group changes on the fly if a "better" hub vehicle joins the vehicular micro cloud. The factors described in the preceding paragraph are used to determine whether a new vehicle would be better relative to the existing hub vehicle.

In some embodiments, the hub vehicle stores technical data. The technical data includes digital data describing the technological capabilities of each vehicle included in the vehicular micro cloud. The hub vehicle also has access to each vehicle's sensor data because these vehicles broadcast V2X messages that include the sensor data as the payload for the V2X messages. An example of such V2X messages include BSMs which include such sensor data in part 2 of their payload.

A vehicle's sensor data is the digital data recorded by that vehicle's onboard sensor set 126. In some embodiments, an ego vehicle's sensor data includes the sensor data recorded by another vehicle's sensor set 126; in these embodiments, the other vehicle transmits the sensor data to the ego vehicle via a V2X communication such as a BSM or some other V2X communication.

In some embodiments, the technical data is an element of the sensor data. In some embodiments, the vehicles distribute their sensor data by transmitting BSMs that includes the sensor data in its payload and this sensor data includes the technical data for each vehicle that transmits a BSM; in this way, the hub vehicle receives the technical data for each of the vehicles included in the vehicular micro cloud.

In some embodiments, the hub vehicle is whichever member vehicle of a vehicular micro cloud has a fastest onboard computer relative to the other member vehicles.

In some embodiments, the localization system is operable to provide its functionality to operating environments and network architectures that do not include a server. Use of servers is problematic because they create latency. For example, some prior art systems require that groups of vehicles relay all their messages to one another through a server. This is particularly problematic and prone to latency which renders the solution inoperable in real-world scenarios, especially for safety critical scenarios. By comparison, the use of server is an optional feature in for the localization system. Indeed, the preferred embodiment would not include a server since, for example: (1) inclusion of a server leads to undesirable latency; and (2) the computational power of the server is not needed by the vehicular micro clouds because the whole point of vehicular micro clouds is to harness the unused computational abilities of the fleet of vehicles that are on the roadway at any given time.

In some embodiments, the localization system is operable to provide its functionality even though the vehicle which includes the localization system does not have a Wi-Fi antenna as part of its communication unit. By comparison, some of the existing solutions require the use of a Wi-Fi antenna in order to provide their functionality. Because the localization system does not require a Wi-Fi antenna, it is able to provide its functionality to more vehicles, including older vehicles without Wi-Fi antennas.

In some embodiments, the localization system is operable to provide its functionality even though the vehicle which includes the localization system does not have a V2X radio as part of its communication unit. By comparison, some of the existing solutions require the use of a V2X radio in order to provide their functionality. Because the localization system does not require a V2X radio, it is able to provide its functionality to more vehicles, including older vehicles without V2X radios.

In some embodiments, the localization system includes code and routines that, when executed by a processor, cause the processor to control when a member of the vehicular micro cloud may leave or exit the vehicular micro cloud. This approach is beneficial because it means the hub vehicle has certainty about how much computing resources it has at any given time since it controls when vehicles (and their computing resources) may leave the vehicular micro cloud. The existing solutions do not provide this functionality.

In some embodiments, the localization system includes code and routines that, when executed by a processor, cause the processor to designate a particular vehicle to serve as a hub vehicle responsive to determining that the particular vehicle has sufficient unused computing resources and/or trustworthiness to provide micro cloud services to a vehicular micro cloud using the unused computing resources of the particular vehicle. This is beneficial because it guarantees that only those vehicles having something to contribute to the members of the vehicular micro cloud may join the vehicular micro cloud.

In some embodiments, the localization system manages the vehicular micro cloud so that it is accessible for membership by vehicles which do not have V2V communication capability. This is beneficial because it ensures that legacy vehicles have access to the benefits provided by the vehicular micro cloud. The existing approaches do not provide this functionality.

In some embodiments, the localization system is configured so that a particular vehicle (e.g., the ego vehicle) is pre-designated by a vehicle manufacturer to serve as a hub vehicle for any vehicular micro cloud that it joins. The existing approaches do not provide this functionality.

The existing solutions generally do not include vehicular micro clouds. Some groups of vehicles (e.g., cliques) might appear to be a vehicular micro cloud when they in fact are not a vehicular micro cloud. For example, in some embodiments a vehicular micro cloud requires that all its members share it unused computing resources with the other members of the vehicular micro cloud. Any group of vehicles that does not require all its members to share their unused computing resources with the other members is not a vehicular micro cloud.

In some embodiments, a vehicular micro cloud does not require a server and preferably would not include one. Accordingly, any group of vehicles that includes a server or whose functionality incorporates a server is not a vehicular micro cloud as this term is used herein.

In some embodiments, a vehicular micro cloud is operable to harness the unused computing resources of many different vehicles to perform complex computational tasks that a single vehicle alone cannot perform due to the computational limitations of a vehicle's onboard vehicle computer which are known to be limited. Accordingly, any group of vehicles that does harness the unused computing resources of many different vehicles to perform complex computational tasks that a single vehicle alone cannot perform is not a vehicular micro cloud.

In some embodiments, a vehicular micro cloud can include vehicles that are parked, vehicles that are traveling in different directions, infrastructure devices, or almost any endpoint that is within communication range of a member of the vehicular micro cloud.

In some embodiments, vehicles are required to have a predetermined threshold of unused computing resources to become members of a vehicular micro cloud. Accordingly, any group of vehicles that does not require vehicles to have a predetermined threshold of unused computing resources to become members of the group is not a vehicular micro cloud in some embodiments.

In some embodiments, a hub of a vehicular micro cloud is pre-designated by a vehicle manufacturer by the inclusion of one a bit or a token in a memory of the vehicle at the time of manufacture that designates the vehicle as the hub of all vehicular micro clouds which it joins. Accordingly, if a group of vehicles does not include a hub vehicle having a bit or a token in their memory from the time of manufacture that designates it as the hub for all groups of vehicles that it joins, then this group is not a vehicular micro cloud in some embodiments.

A vehicular micro cloud is not a V2X network or a V2V network. For example, neither a V2X network nor a V2V network include a cluster of vehicles in a same geographic region that are computationally joined to one another as members of a logically associated cluster that make available their unused computing resources to the other members of the cluster. In some embodiments, any of the steps of the methods described herein (e.g., the first example general method described above, the second example general method described above, or the method depicted in FIG. 3) is executed by one or more vehicles which are working together collaboratively using V2X communications for the purpose of completing one or more steps of the method(s). By comparison, solutions which only include V2X networks or V2V networks do not necessarily include the ability of two or more vehicles to work together collaboratively to complete one or more steps of a method.

In some embodiments, a vehicular micro cloud includes vehicles that are parked, vehicles that are traveling in different directions, infrastructure devices, or almost any endpoint that is within communication range of a member of the vehicular micro cloud. By comparison, a group of vehicles that exclude such endpoints as a requirement of being a member of the group are not vehicular micro clouds according to some embodiments.

A vehicular micro cloud is responsible to doing computational analysis itself using the onboard vehicle computers of its members. A group of vehicles which relies on a cloud server for its computational analysis, or the difficult parts of its computational analysis, is not a vehicular micro cloud. Although FIG. 1 depicts a server in an operating environment that includes the localization system, the server is an optional feature of the operating environment. An example of a preferred embodiment of the localization system does not include the server in the operating environment which includes the localization system.

In some embodiments, the localization system enables a group of vehicles to perform computationally expensive tasks that could not be completed by any one vehicle in isolation.

Cellular Vehicle to Everything (C-V2X)

A DSRC-equipped device is any processor-based computing device that includes a DSRC transmitter and a DSRC receiver. For example, if a vehicle includes a DSRC transmitter and a DSRC receiver, then the vehicle may be described as "DSRC-enabled" or "DSRC-equipped." Other types of devices may be DSRC-enabled. For example, one or more of the following devices may be DSRC-equipped: an edge server; a cloud server; a roadside unit ("RSU"); a traffic signal; a traffic light; a vehicle; a smartphone; a smartwatch; a laptop; a tablet computer; a personal computer; and a wearable device.

In some embodiments, one or more of the connected vehicles described above are DSRC-equipped vehicles. A DSRC-equipped vehicle is a vehicle that includes a standard-compliant GPS unit and a DSRC radio which is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages on a band that is reserved for DSRC messages.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

A DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, a DSRC-equipped device (e.g., a DSRC-equipped vehicle) does not include a conventional global positioning system unit ("GPS unit"), and instead includes a standard-compliant GPS unit. A conventional GPS unit provides positional information that describes a position of the conventional GPS unit with an accuracy of plus or minus 10 meters of the actual position of the conventional GPS unit. By comparison, a standard-compliant GPS unit provides GPS data that describes a position of the standard-compliant GPS unit with an accuracy of plus or minus 1.5 meters of the actual position of the standard-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in even when the roadway has more than one lanes of travel each heading in a same direction.

In some embodiments, a standard-compliant GPS unit is operable to identify, monitor and track its two-dimensional position within 1.5 meters, in all directions, of its actual position 68% of the time under an open sky.

In some embodiments, the connected vehicle described herein, and depicted in FIG. 1, includes a V2X radio instead of a DSRC radio. In these embodiments, all instances of the term DSRC" as used in this description may be replaced by the term "V2X." For example, the term "DSRC radio" is replaced by the term "V2X radio," the term "DSRC message" is replaced by the term "V2X message," and so on.

Currently, 75 MHz of the 5.9 GHz band is designated for DSRC. However, in some embodiments, the lower 45 MHz of the 5.9 GHz band (specifically, 5.85-5.895 GHz) is reserved by a jurisdiction (e.g., the United States) for unlicensed use (i.e., non-DSRC and non-vehicular related use) whereas the upper 30 MHz of the 5.9 GHz band (specifically, 5.895-5.925 GHz) is reserved by the jurisdiction for Cellular Vehicle to Everything (C-V2X) use. In these embodiments, the V2X radio depicted in FIG. 1 is a C-V2X radio which is operable to send and receive C-V2X wireless messages on the upper 30 MHz of the 5.9 GHz band (i.e., 5.895-5.925 GHz). In these embodiments, the localization system 199 is operable to cooperate with the C-V2X radio and provide its functionality using the content of the C-V2X wireless messages.

In some of these embodiments, some or all of the digital data depicted in FIG. 1 is the payload for one or more C-V2X messages. In some embodiments, the C-V2X message is a BSM.

In some embodiments, instances of the term "DSRC" as used herein may be replaced by the term "C-V2X." For example, the term "DSRC radio" is replaced by the term "C-V2X radio," the term "DSRC message" is replaced by the term "C-V2X message," and so on.

In some embodiments, instances of the term "V2X" as used herein may be replaced by the term "C-V2X."

The localization system utilizes a vehicular network in some embodiments. A vehicular network includes, for example, one or more of the following: V2V; V2X; vehicle-to-network-to-vehicle (V2N2V); vehicle-to-infrastructure (V2I); cellular-V2X (C-V2X); any derivative or combination of the networks listed herein; and etc.

Vehicular Network

In some embodiments, the localization system includes software installed in an onboard unit of a connected vehicle. This software is the "localization system" described herein.

An example operating environment for the embodiments described herein includes an ego vehicle, a cooperative vehicle, and, optionally, one or more remote vehicle. The ego vehicle, cooperative vehicle, and the remote vehicle are connected vehicles having communication units that enable them to send and receive wireless messages via one or more vehicular networks. In some embodiments, the ego vehicle and the cooperative vehicle include an onboard unit having a localization system stored therein. One or more of the remote vehicles may also include a localization system. An example of a preferred embodiment of the localization system includes a serverless operating environment. A serverless operating environment is an operating environment which includes at least one localization system and does not include a server.

In some embodiments, the localization system includes code and routines that are operable, when executed by a processor of the onboard unit, to cause the processor to execute one or more of the steps of one or more of the following: the example general method; and the method 300 depicted in FIG. 3.

In some embodiments, this application is related to U.S. patent application Ser. No. 15/644,197 filed on Jul. 7, 2017 and entitled "Computation Service for Mobile Nodes in a Roadway Environment," the entirety of which is hereby incorporated by reference.

Example Operative Environment

Embodiments of the localization system are now described. Referring now to FIG. 1, depicted is a block diagram illustrating an operating environment 100 for a localization system 199 according to some embodiments. The operating environment 100 is present in a geographic region so that each of the elements of the operating environment 100 is present in the same geographic region.

The operating environment 100 may include one or more of the following elements: an ego vehicle 123 (referred to herein as a "vehicle 123" or an "ego vehicle 123"); an Nth remote vehicle 124 (where "N" refers to any positive whole number greater than one); and a cooperative vehicle 128. These elements are communicatively coupled to one another via a network 105. These elements of the operating environment 100 are depicted by way of illustration. In practice, the operating environment 100 may include one or more of the elements depicted in FIG. 1. The Nth remote vehicle 124 may be referred to as a remote vehicle 124.

The operating environment 100 also includes a roadway environment 140. The roadway environment 140 was described above, and that description will not be repeated here.

In some embodiments, one or more of the ego vehicle 123, the remote vehicle 124, the cooperative vehicle 128 and the network 105 are elements of a vehicular micro cloud 194. The vehicular micro cloud 194 is depicted in FIG. 1 with a dashed line to indicate that it is an optional element of the operating environment 100. The remote vehicle 124 is also depicted with a dashed line in FIG. 1 to indicate that it is an optional feature of the operating environment 100.

In some embodiments, the operating environment 100 is a serverless operating environment.

In some embodiments, the ego vehicle 123, the remote vehicle 124, and the cooperative vehicle 128 include similar elements. For example, each of these elements of the operating environment 100 include their own processor 125, bus 121, memory 127, communication unit 145, processor 125, sensor set 126, onboard unit 139, standard-compliant GPS unit 150, and localization system 199. These elements of the ego vehicle 123, the remote vehicle 124, and the cooperative vehicle 128 provide the same or similar functionality regardless of whether they are included in the ego vehicle 123, the remote vehicle 124, or the cooperative vehicle 128. Accordingly, the descriptions of these elements will not be repeated in this description for each of the ego vehicle 123, remote vehicle 124, and cooperative vehicle 128.

In the depicted embodiment, the ego vehicle 123, remote vehicle 124, and the cooperative vehicle 128 may each store similar digital data.

The vehicular micro cloud 194 may be a stationary vehicular micro cloud such as described by U.S. patent application Ser. No. 15/799,964 filed on Oct. 31, 2017 and entitled "Identifying a Geographic Location for a Stationary Micro-Vehicular Cloud," the entirety of which is herein incorporated by reference. In this patent application the vehicular micro cloud 194 may be a stationary vehicular micro cloud or a mobile vehicular micro cloud. For example, each of the ego vehicle 123, the cooperative vehicle 128, and the remote vehicle 124 are vehicular micro cloud members because they are connected endpoints that are members of the vehicular micro cloud 194 that can access and use the unused computing resources (e.g., their unused processing power, unused data storage, unused sensor capabilities, unused bandwidth, etc.) of the other vehicular micro cloud members using wireless communications that are transmitted via the network 105 and these wireless communicates are not required to be relayed through a cloud server. As used in this patent application, the terms a "vehicular micro cloud" and a "micro-vehicular" cloud mean the same thing.

In some embodiments, the vehicular micro cloud 194 is a vehicular micro cloud such as the one described in U.S. patent application Ser. No. 15/799,963.

In some embodiments, a vehicular micro cloud 194 is not a V2X network or a V2V network because, for example, such networks do not include allowing endpoints of such networks to access and use the unused computing resources of the other endpoints of such networks. By comparison, a vehicular micro cloud 194 requires allowing all members of the vehicular micro cloud 194 to access and use designated unused computing resources of the other members of the vehicular micro cloud 194. In some embodiments, endpoints must satisfy a threshold of unused computing resources in order to join the vehicular micro cloud 194. The hub vehicle of the vehicular micro cloud 194 executes a process to: (1) determine whether endpoints satisfy the threshold as a condition for joining the vehicular micro cloud 194; and (2) determine whether the endpoints that do join the vehicular micro cloud 194 continue to satisfy the threshold after they join as a condition for continuing to be members of the vehicular micro cloud 194.

In some embodiments, a member of the vehicular micro cloud 194 includes any endpoint (e.g., the ego vehicle 123, the remote vehicle 124, the cooperative vehicle 128, etc.) which has completed a process to join the vehicular micro cloud 194 (e.g., a handshake process with the coordinator of the vehicular micro cloud 194). Cloud servers are excluded from membership in some embodiments. A member of the vehicular micro cloud 194 is described herein as a "member" or a "micro cloud member."

In some embodiments, the memory 127 of one or more of the endpoints stores member data. The member data is digital data that describes one or more of the following: the identity of each of the micro cloud members; what digital data, or bits of data, are stored by each micro cloud member; what computing services are available from each micro cloud member; what computing resources are available from each micro cloud member and what quantity of these resources are available; and how to communicate with each micro cloud member.

In some embodiments, the member data describes logical associations between endpoints which are a necessary component of the vehicular micro cloud 194 and serves the differentiate the vehicular micro cloud 194 from a mere V2X network. In some embodiments, a vehicular micro cloud 194 must include a hub vehicle and this is a further differentiation from a vehicular micro cloud 194 and a V2X network or a group or clique of vehicles which is not a vehicular micro cloud 194.

The vehicular micro cloud 194 does not include a hardware server. Accordingly, the vehicular micro cloud 194 may be described as serverless.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2X, LTE-D2D, VoLTE or any other mobile data network or combination of mobile data networks. Further, the network 105 may include one or more IEEE 802.11 wireless networks.

In some embodiments, the network 105 is a V2X network. For example, the network 105 must include a vehicle, such as the ego vehicle 123, as an originating endpoint for each wireless communication transmitted by the network 105. An originating endpoint is the endpoint that initiated a wireless communication using the network 105. In some embodiments, the network 105 is a vehicular network.

In some embodiments, the network 105 is a C-V2X network.

The network 105 is an element of the vehicular micro cloud 194. Accordingly, the vehicular micro cloud 194 is not the same thing as the network 105 since the network is merely a component of the vehicular micro cloud 194. For example, the network 105 does not include member data. The network 105 also does not include a hub vehicle.

In some embodiments, one or more of the ego vehicle 123 and the remote vehicle 124 are C-V2X equipped vehicles. For example, the ego vehicle 123 includes a standard-compliant GPS unit 150 that is an element of the sensor set 126 and a C-V2X radio that is an element of the communication unit 145. The network 105 may include a C-V2X communication channel shared among the ego vehicle 123 and a second vehicle such as the remote vehicle 124 and/or the cooperative vehicle 128.

A C-V2X radio is hardware that includes a C-V2X receiver and a C-V2X transmitter. The C-V2X radio is operable to wirelessly send and receive C-V2X messages on a band that is reserved for C-V2X messages.

The ego vehicle 123 may include a car, a truck, a sports utility vehicle, a bus, a semi-truck, a drone, or any other roadway-based conveyance. In some embodiments, the ego vehicle 123 may include an autonomous vehicle or a semi-autonomous vehicle. Although not depicted in FIG. 1, in some embodiments, the ego vehicle 123 includes an autonomous driving system. The autonomous driving system includes code and routines that provides sufficient autonomous driving features to the ego vehicle 123 to render the ego vehicle 123 an autonomous vehicle or a highly autonomous vehicle. In some embodiments, the ego vehicle 123 is a Level III autonomous vehicle or higher as defined by the National Highway Traffic Safety Administration and the Society of Automotive Engineers.

The ego vehicle 123 is a connected vehicle. For example, the ego vehicle 123 is communicatively coupled to the network 105 and operable to send and receive messages via the network 105.

The ego vehicle 123 includes one or more of the following elements: a processor 125; a sensor set 126; a standard-compliant GPS unit 150; a vehicle control system 151; a communication unit 145; an onboard unit 139; a memory 127; and a localization system 199. These elements may be communicatively coupled to one another via a bus 121.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1 depicts a single processor 125 present in the ego vehicle 123, multiple processors may be included in the ego vehicle 123. The processor 125 may include a graphical processing unit. Other processors, operating systems, sensors, displays, and physical configurations may be possible.

In some embodiments, the processor 125 may be an element of a processor-based computing device of the ego vehicle 123. For example, the ego vehicle 123 may include one or more of the following processor-based computing devices and the processor 125 may be an element of one of these devices: an onboard vehicle computer; an electronic control unit; a navigation system; a vehicle control system (e.g., an advanced driver assistance system ("ADAS") or autonomous driving system); and a head unit. In some embodiments, the processor 125 is an element of the onboard unit 139.

The onboard unit 139 is a special purpose processor-based computing device. In some embodiments, the onboard unit 139 is a communication device that includes one or more of the following elements: the communication unit 145; the processor 125; the memory 127; and the localization system 199. In some embodiments, the onboard unit 139 is the computer system 200 depicted in FIG. 2. In some embodiments, the onboard unit 139 is an electronic control unit (ECU).

The sensor set 126 includes one or more onboard sensors. The sensor set 126 may record sensor measurements that describe the ego vehicle 123 or the physical environment that includes the ego vehicle 123. The sensor data includes digital data that describes the sensor measurements.

In some embodiments, the sensor set 126 may include one or more sensors that are operable to measure the physical environment outside of the ego vehicle 123. For example, the sensor set 126 may include cameras, lidar, radar, sonar and other sensors that record one or more physical characteristics of the physical environment that is proximate to the ego vehicle 123.

In some embodiments, the sensor set 126 may include one or more sensors that are operable to measure the physical environment inside a cabin of the ego vehicle 123. For example, the sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 126 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the standard-compliant GPS unit 150); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 126 may be operable to record sensor data that describes images or other measurements of the physical environment such as the conditions, objects, and other vehicles present in the roadway environment. Examples of objects include pedestrians, animals, traffic signs, traffic lights, potholes, etc. Examples of conditions include weather conditions, road surface conditions, shadows, leaf cover on the road surface, any other condition that is measurable by a sensor included in the sensor set 126.

The physical environment may include a roadway region, parking lot, or parking garage that is proximate to the ego vehicle 123. The sensor data may describe measurable aspects of the physical environment. In some embodiments, the physical environment is the roadway environment 140. As such, in some embodiments, the roadway environment 140 includes one or more of the following: a roadway region that is proximate to the ego vehicle 123; a parking lot that is proximate to the ego vehicle 123; a parking garage that is proximate to the ego vehicle 123; the conditions present in the physical environment proximate to the ego vehicle 123; the objects present in the physical environment proximate to the ego vehicle 123; and other vehicles present in the physical environment proximate to the ego vehicle 123. An item is "proximate to the ego vehicle 123" if it is directly measurable by a sensor of the ego vehicle 123 or its presence is inferable and/or determinable by the localization system 199 based on analysis of the sensor data which is recorded by the ego vehicle 123 and/or one or more of the vehicular micro cloud 194.

In some embodiments, the sensors of the sensor set 126 are operable to collect sensor data. The sensors of the sensor set 126 include any sensors that are necessary to measure and record the measurements described by the sensor data. In some embodiments, the sensor data includes any measurements that are necessary to generate the other digital data stored by the memory 127.

The standard-compliant GPS unit 150 includes a GPS unit that is compliant with one or more standards that govern the transmission of V2X wireless communications ("V2X communication" if singular, "V2X communications" if plural). For example, some V2X standards require that BSMs are transmitted at intervals by vehicles and that these BSMs must include within their payload GPS data having one or more attributes.

An example of an attribute for GPS data is accuracy. In some embodiments, the standard-compliant GPS unit 150 is operable to generate GPS measurements which are sufficiently accurate to describe the location of the ego vehicle 123 with lane-level accuracy. Lane-level accuracy is necessary to comply with some of the existing and emerging standards for V2X communication. Lane-level accuracy means that the GPS measurements are sufficiently accurate to describe which lane of a roadway that the ego vehicle 123 is traveling (e.g., the geographic position described by the GPS measurement is accurate to within 1.5 meters of the actual position of the ego vehicle 123 in the real-world). Lane-level accuracy is described in more detail below.

In some embodiments, the standard-compliant GPS unit 150 is compliant with one or more standards governing V2X communications but does not provide GPS measurements that are lane-level accurate.

In some embodiments, the standard-compliant GPS unit 150 includes any hardware and software necessary to make the ego vehicle 123 or the standard-compliant GPS unit 150 compliant with one or more of the following standards governing V2X communications, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the standard-compliant GPS unit 150 is operable to provide GPS data describing the location of the ego vehicle 123 with lane-level accuracy. For example, the ego vehicle 123 is traveling in a lane of a multi-lane roadway. Lane-level accuracy means that the lane of the ego vehicle 123 is described by the GPS data so accurately that a precise lane of travel of the ego vehicle 123 may be accurately determined based on the GPS data for this vehicle 123 as provided by the standard-compliant GPS unit 150.

In some embodiments, the GPS data describes a location of a queue with lane-level accuracy.

An example process for generating GPS data describing a geographic location of an object (e.g., a queue, the ego vehicle 123, the remote vehicle 124, or some other object located in a roadway environment) is now described according to some embodiments. In some embodiments, the localization system 199 include code and routines that are operable, when executed by the processor 125, to cause the processor to: analyze (1) GPS data describing the geographic location of the ego vehicle 123 and (2) sensor data describing the range separating the ego vehicle 123 from an object and a heading for this range; and determine, based on this analysis, GPS data describing the location of the object. The GPS data describing the location of the object may also have lane-level accuracy because, for example, it is generated using accurate GPS data of the ego vehicle 123 and accurate sensor data describing information about the object.

In some embodiments, the standard-compliant GPS unit 150 includes hardware that wirelessly communicates with a GPS satellite (or GPS server) to retrieve GPS data that describes the geographic location of the ego vehicle 123 with a precision that is compliant with a V2X standard. One example of a V2X standard is the DSRC standard. Other standards governing V2X communications are possible. The DSRC standard requires that GPS data be precise enough to infer if two vehicles (one of which is, for example, the ego vehicle 123) are located in adjacent lanes of travel on a roadway. In some embodiments, the standard-compliant GPS unit 150 is operable to identify, monitor and track its two-dimensional position within 1.5 meters of its actual position 68% of the time under an open sky. Since roadway lanes are typically no less than 3 meters wide, whenever the two-dimensional error of the GPS data is less than 1.5 meters the localization system 199 described herein may analyze the GPS data provided by the standard-compliant GPS unit 150 and determine what lane the ego vehicle 123 is traveling in based on the relative positions of two or more different vehicles (one of which is, for example, the ego vehicle 123) traveling on a roadway at the same time.

By comparison to the standard-compliant GPS unit 150, a conventional GPS unit which is not compliant with the DSRC standard is unable to determine the location of a vehicle (e.g., the ego vehicle 123) with lane-level accuracy. For example, a typical parking space is approximately 3 meters wide. However, a conventional GPS unit only has an accuracy of plus or minus 10 meters relative to the actual location of the ego vehicle 123. As a result, such conventional GPS units are not sufficiently accurate to enable the localization system 199 to determine the lane of travel of the ego vehicle 123. This measurement improves the accuracy of the GPS data describing the location of parking spaces used by the localization system 199 when providing its functionality.

In some embodiments, the memory 127 stores two types of GPS data. The first is GPS data of the ego vehicle 123 and the second is GPS data of one or more objects (e.g., the remote vehicle 124 or some other object in the roadway environment). The GPS data of the ego vehicle 123 is digital data that describes a geographic location of the ego vehicle 123. The GPS data of the parking space is digital data that describes a geographic location of an object. One or more of these two types of GPS data may have lane-level accuracy. In some embodiments, one or more of these two types of GPS data are described by the sensor data.

The communication unit 145 transmits and receives data to and from a network 105 or to another communication channel. In some embodiments, the communication unit 145 may include a DSRC transmitter, a DSRC receiver and other hardware or software necessary to make the ego vehicle 123 a DSRC-equipped device. In some embodiments, the localization system 199 is operable to control all or some of the operation of the communication unit 145.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. Pat. No. 9,369,262 filed on Aug. 28, 2014 and entitled "Full-Duplex Coordination System," the entirety of which is incorporated herein by reference. In some embodiments, some, or all of the communications necessary to execute the methods described herein are executed using full-duplex wireless communication as described in U.S. Pat. No. 9,369,262.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio. The V2X radio is a hardware unit that includes one or more transmitters and one or more receivers that is operable to send and receive any type of V2X message. In some embodiments, the V2X radio is a C-V2X radio that is operable to send and receive C-V2X messages. In some embodiments, the C-V2X radio is operable to send and receive C-V2X messages on the upper 30 MHz of the 5.9 GHz band (i.e., 5.895-5.925 GHz). In some embodiments, some or all of the wireless messages described above with reference to the example general method or below with reference to the method 300 depicted in FIG. 3 are transmitted by the C-V2X radio on the upper 30 MHz of the 5.9 GHz band (i.e., 5.895-5.925 GHz) as directed by the localization system 199.

In some embodiments, the V2X radio includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band. In some embodiments, the DSRC transmitter and the DSRC receiver operate on some other band which is reserved exclusively for DSRC.

In some embodiments, the V2X radio includes a non-transitory memory which stores digital data that controls the frequency for broadcasting BSMs. In some embodiments, the non-transitory memory stores a buffered version of the GPS data for the ego vehicle 123 so that the GPS data for the ego vehicle 123 is broadcast as an element of the BSM messages which are regularly broadcast by the V2X radio (e.g., at an interval of once every 0.10 seconds).

In some embodiments, the V2X radio includes any hardware or software which is necessary to make the ego vehicle 123 compliant with the DSRC standards. In some embodiments, the standard-compliant GPS unit 150 is an element of the V2X radio.

The memory 127 may include a non-transitory storage medium. The memory 127 may store instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 may store any or all of the digital data or information described herein.

As depicted in FIG. 1, the memory 127 stores the following digital data: the sensor data; C image data for time t1 181; C observation data for time t1 182; 2D flow data for time t2; E image data for time t1 184; E observation data for time t1 185; 3D flow data for time t2 186; E image data for time t2 188; E observation data for time t2 189; 3D localization data for time t2 190; data set of earlier instances of C observation data 191; and correspondence data 192. These elements were described above with reference to the example general method, and so, those descriptions will not be repeated here. In some embodiments, the memory 127 stores some or all of the digital data described herein. In some embodiments, the memory 127 stores any digital data that is necessary for the localization system 199 to provide its functionality.

In some embodiments, the ego vehicle 123 includes a vehicle control system. A vehicle control system includes one or more ADAS systems or an autonomous driving system.

Examples of an ADAS system include one or more of the following elements of a vehicle: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane keep assistance ("LKA") system; a pedestrian protection system; a traffic sign recognition system; a turning assistant; and a wrong-way driving warning system. Other types of ADAS systems are possible. This list is illustrative and not exclusive.

An ADAS system is an onboard system of the ego vehicle 123 that is operable to identify one or more factors (e.g., using one or more onboard vehicle sensors) affecting the ego vehicle 123 and modify (or control) the operation of the ego vehicle to respond to these identified factors. Described generally, ADAS system functionality includes the process of (1) identifying one or more factors affecting the ego vehicle and (2) modifying the operation of the ego vehicle, or some component of the ego vehicle, based on these identified factors.

For example, an ACC system installed and operational in an ego vehicle may identify that a subject vehicle being followed by the ego vehicle with the cruise control system engaged has increased or decreased its speed. The ACC system may modify the speed of the ego vehicle based on the change in speed of the subject vehicle, and the detection of this change in speed and the modification of the speed of the ego vehicle is an example the ADAS system functionality of the ADAS system.

Similarly, an ego vehicle may have a LKA system installed and operational in an ego vehicle may detect, using one or more external cameras of the ego vehicle, an event in which the ego vehicle is near passing a center yellow line which indicates a division of one lane of travel from another lane of travel on a roadway. The LKA system may provide a notification to a driver of the ego vehicle that this event has occurred (e.g., an audible noise or graphical display) or take action to prevent the ego vehicle from actually passing the center yellow line such as making the steering wheel difficult to turn in a direction that would move the ego vehicle over the center yellow line or actually moving the steering wheel so that the ego vehicle is further away from the center yellow line but still safely positioned in its lane of travel. The process of identifying the event and acting responsive to this event is an example of the ADAS system functionality provided by the LKA system.

The other ADAS systems described above each provide their own examples of ADAS system functionalities which are known in the art, and so, these examples of ADAS system functionality will not be repeated here.

In some embodiments, the ADAS system includes any software or hardware included in the vehicle that makes that vehicle be an autonomous vehicle or a semi-autonomous vehicle. In some embodiments, an autonomous driving system is a collection of ADAS systems which provides sufficient ADAS functionality to the ego vehicle 123 to render the ego vehicle 123 an autonomous or semi-autonomous vehicle.

In some embodiments, the 3D flow data for time t2 186 and/or the 3D localization data for time t2 190 are inputted into an ADAS system of the ego vehicle 123 by the localization system 199 and used by the ADAS system to provide the functionality of the ADAS system. For example, the 3D flow data for time t2 186 and/or the 3D localization data for time t2 190 are inputted by the communication module 202 depicted in FIG. 2 into the vehicle control system 151 depicted in FIG. 2.

In some embodiments, the localization system 199 includes code and routines that are operable, when executed by the processor 125, to execute one or more steps of one or more of the method 300 described below with reference to FIG. 3. In some embodiments, the localization system 199 includes code and routines that are operable, when executed by the processor 125, to execute one or more steps of the example general method described above. In In some embodiments, the localization system 199 is an element of the onboard unit 139 or some other onboard vehicle computer.

In some embodiments, the localization system 199 is implemented using hardware including a field-programmable gate array ("FPGA") or an application-specific integrated circuit ("ASIC"). In some other embodiments, the localization system 199 is implemented using a combination of hardware and software.

The remote vehicle 124 includes elements and functionality which are similar to those described above for the ego vehicle 123, and so, those descriptions will not be repeated here.

The cooperative vehicle 128 includes elements and functionality which are similar to those described above for the ego vehicle 123, and so, those descriptions will not be repeated here.

In some embodiments, the ego vehicle 123, the remote vehicle, and the cooperative vehicle 128 are located in a roadway environment 140. The roadway environment is a portion of the real-world that includes a roadway, the ego vehicle 123, the remote vehicle 124, and the cooperative vehicle 128. The roadway environment 140 may include other elements such as the vehicular micro cloud 194, roadway signs, environmental conditions, traffic, etc. The roadway environment 140 includes some or all of the tangible and/or measurable qualities described above with reference to the sensor data.

In some embodiments, the real-world includes the real of human experience comprising physical objects and excludes artificial environments and "virtual" worlds such as computer simulations.

In some embodiments, the roadway environment includes a roadside unit that in includes an edge server. The edge server is a connected processor-based computing device that is not a member of the vehicular micro cloud 194 and includes an instance of the localization system 199 and a memory 127.

In some embodiments, the edge server is one or more of the following: a hardware server; a personal computer; a laptop; a device such as a roadside unit which is not a member of the vehicular micro cloud 194; or any other processor-based connected device that is not a member of the vehicular micro cloud 194 and includes an instance of the localization system 199 and a non-transitory memory that stores some or all of the digital data that is stored by the memory 127 of the ego vehicle 123 or otherwise described herein. The edge server may include a backbone network.

In some embodiments, the vehicular micro cloud 194 is stationary. In other words, in some embodiments the vehicular micro cloud 194 is a "stationary vehicular micro cloud." A stationary vehicular micro cloud is a wireless network system in which a plurality of connected vehicles (such as the ego vehicle 123, the remote vehicle 124, and the cooperative vehicle 128), and optionally devices such as a roadside unit, form a cluster of interconnected vehicles that are located at a same geographic region. These connected vehicles (and, optionally, connected devices) are interconnected via C-V2X, Wi-Fi, mmWave, DSRC or some other form of V2X wireless communication. For example, the connected vehicles are interconnected via a V2X network which may be the network 105 or some other wireless network that is only accessed by the members of the vehicular micro cloud 194 and not non-members such as the edge server 102. Connected vehicles (and devices such as a roadside unit) which are members of the same stationary vehicular micro cloud make their unused computing resources available to the other members of the stationary vehicular micro cloud.

In some embodiments, the vehicular micro cloud 194 is "stationary" because the geographic location of the vehicular micro cloud 194 is static; different vehicles constantly enter and exit the vehicular micro cloud 194 over time. This means that the computing resources available within the vehicular micro cloud 194 is variable based on the traffic patterns for the geographic location at different times of day: increased traffic corresponds to increased computing resources because more vehicles will be eligible to join the vehicular micro cloud 194; and decreased traffic corresponds to decreased computing resources because less vehicles will be eligible to join the vehicular micro cloud 194.

In some embodiments, the V2X network is a non-infrastructure network. A non-infrastructure network is any conventional wireless network that does not include infrastructure such as cellular towers, servers, or server farms. For example, the V2X network specifically does not include a mobile data network including third-generation (3G), fourth-generation (4G), fifth-generation (5G), long-term evolution (LTE), Voice-over-LTE (VoLTE) or any other mobile data network that relies on infrastructure such as cellular towers, hardware servers or server farms.

In some embodiments, the non-infrastructure network includes Bluetooth® communication networks for sending and receiving data including via one or more of DSRC, mmWave, full-duplex wireless communication and any other type of wireless communication that does not include infrastructure elements. The non-infrastructure network may include vehicle-to-vehicle communication such as a Wi-Fi™ network shared among two or more vehicles 123, 124, 128.

In some embodiments, the wireless messages described herein may be encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the localization system 199 includes encryption keys for encrypting wireless messages and decrypting the wireless messages described herein.

Figure 2:
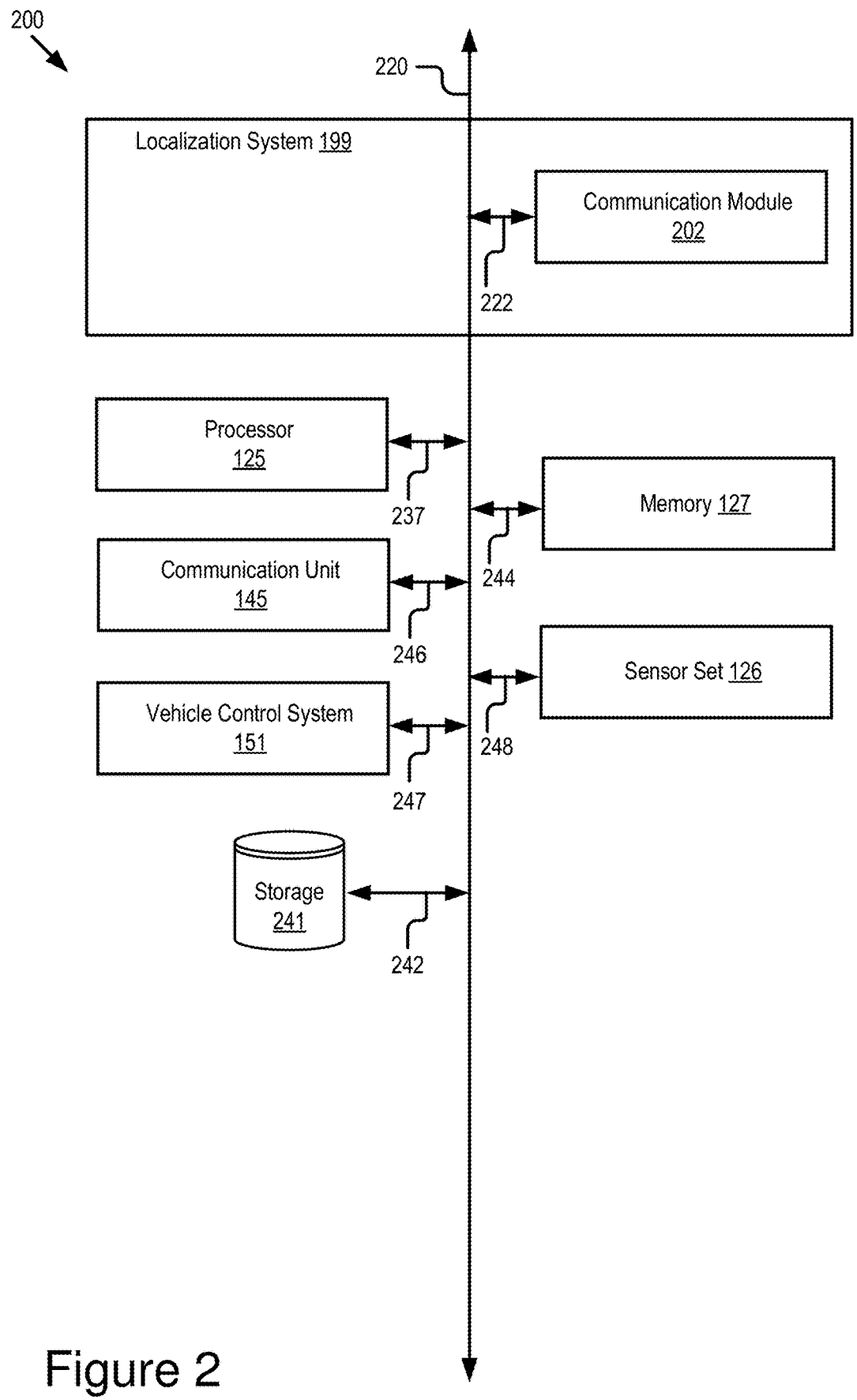
FIG. 2 is a block diagram illustrating an example computer system including a localization system according to some embodiments.

Referring now to FIG. 2, depicted is a block diagram illustrating an example computer system 200 including a localization system 199 according to some embodiments.

In some embodiments, the computer system 200 may include a special-purpose computer system that is programmed to perform one or more steps of one or more of the method 300 described herein with reference to FIG. 3. In some embodiments, the computer system 200 may include a special-purpose computer system that is programmed to perform one or more steps of one or more of the first example general method described above and the second general example described above.

In some embodiments, the computer system 200 may include a processor-based computing device. For example, the computer system 200 may include an onboard vehicle computer system of the ego vehicle 123 or the remote vehicle 124.

The computer system 200 may include one or more of the following elements according to some examples: the localization system 199; a processor 125; a communication unit 145; a vehicle control system 151; a storage 241; and a memory 127. The components of the computer system 200 are communicatively coupled by a bus 220.

In the illustrated embodiment, the processor 125 is communicatively coupled to the bus 220 via a signal line 237. The communication unit 145 is communicatively coupled to the bus 220 via a signal line 246. The vehicle control system 151 is communicatively coupled to the bus 220 via a signal line 247. The storage 241 is communicatively coupled to the bus 220 via a signal line 242. The memory 127 is communicatively coupled to the bus 220 via a signal line 244. The sensor set 126 is communicatively coupled to the bus 220 via a signal line 248.

In some embodiments, the sensor set 126 includes standard-compliant GPS unit. In some embodiments, the communication unit 145 includes a sniffer.

The following elements of the computer system 200 were described above with reference to FIG. 1, and so, these descriptions will not be repeated here: the processor 125; the communication unit 145; the vehicle control system 151; the memory 127; and the sensor set 126.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the localization system 199 includes code and routines that are operable, when executed by the processor 125, to cause the processor 125 to execute one or more steps of the method 300 described herein with reference to FIG. 3. In some embodiments, the localization system 199 includes code and routines that are operable, when executed by the processor 125, to cause the processor 125 to execute one or more steps of the example general method described above.

In the illustrated embodiment shown in FIG. 2, the localization system 199 includes a communication module 202.

The communication module 202 can be software including routines for handling communications between the localization system 199 and other components of the computer system 200. In some embodiments, the communication module 202 can be a set of instructions executable by the processor 125 to provide the functionality described below for handling communications between the localization system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100.

In some embodiments, the communication module 202 receives data from components of the localization system 199 and stores the data in one or more of the storage 241 and the memory 127.

In some embodiments, the communication module 202 may handle communications between components of the localization system 199 or the computer system 200.

Referring now to FIG. 3, depicted is a flowchart of an example method 300. The method 300 includes step 305, step 310, step 315, and step 320 as depicted in FIG. 3. The steps of the method 300 may be executed in any order, and not necessarily those depicted in FIG. 3. In some embodiments, one or more of the steps are skipped or modified in ways that are described herein or known or otherwise determinable by those having ordinary skill in the art of vehicular micro clouds.

Referring now to FIG. 5, this process 500 is described in detail above with reference to the example general method. Between steps 1 and 2 of the process 500 is a reference to a neural network. In some embodiments, the localization system includes an artificial neural network (ANN). As used herein, the term "neural network" refers to an ANN. An ANN include and routines that are operable, when executed by a processor, to cause the processor to learn to perform tasks by considering examples. In general, ANN provide their functionality without being programmed with task-specific rules. However, some ANN are programmed with task-specific rules.

An ANN is based on a collection of connected units or nodes called artificial neurons (as used herein, the term "neurons" or "neuron" refers to an "artificial neuron"). A connection of the ANN is operable to transmit a signal to other neurons. A neuron that receives a signal then processes it and can signal neurons connected to it.

In ANN implementations, the "signal" at a connection is a real number, and the output of each neuron is computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals travel from the first layer (the input layer), to the last layer (the output layer), possibly after traversing the layers multiple times.

ANN are configured to perform a variety of tasks, including data processing. In some embodiments, the localization system includes an ANN that is configured to execute step 2 of the process 500 and generate the 2D flow data for time t2 183 based the sequential observation from time t1 to time t2 of E observation data (e.g., the sequence or change of observation data from time t1 to time t2 as determinable by analyzing elements 185 and 189 in FIG. 1) to generate 2D flow data for time t2.

In some embodiments, the ANN included in the localization system 199 includes code and routines that are operable to determine the sequence or change of observation data from time t1 to time t2 based on elements 185 and 189 depicted in FIG. 1. For example, in some embodiments the processor of the ego vehicle executes the ANN to analyze elements 185 and 189 in FIG. 1 to determine this sequence or change in observation data and thereby generate the 2D flow data for time t2 183.

In some embodiments, the term "sequence" depicted in FIG. 5 refers to this sequential observation which is made by the localization system 199 based on the digital data included in observation data elements such as elements 185 and 189.

In some embodiments, the process 500 includes an inference of the flow of the objects in 3D space (see, e.g., the process 500 depicted in FIG. 5). In some embodiments, this inference is a point of novelty because it allows the localization system of the ego vehicle to estimate C observation data at time t2 when the localization system of the ego vehicle has not yet received it (because the localization system of the ego vehicle cannot possibly have received this C observation data at time t2 due to latency associated with V2V communication between the ego vehicle and the cooperative vehicle), thereby overcoming the latency problem described above in the problem statement. An example of the 3D flow data for time t2 according to some embodiments includes the 3D flow data for time t2 186 depicted in FIG. 1.

As used in FIG. 5, "depth" refers to depth sensor measurements recorded by a sensor set. The term "sequence" depicted in FIG. 5 refers to this sequential observation which is made by the localization system 199 based on the digital data included in observation data elements such as elements 185, 189, and 191.

Elements 183, 186, and 190 as used in FIG. 5 refer to the 2D flow data for time t2 183, the E observation data for time t2 189, and the 3D localization data for time t2 190 as depicted in FIG. 1, respectively.

The term "intrinsic parameter" used in FIG. 5 refers to an intrinsic parameter of a camera (e.g., a camera included in a sensor set of the ego vehicle). An example of the intrinsic parameter includes a physical setting of the camera such as the vertical focal length, the horizontal focal length, or any other physical setting of a camera.

The term "initial location" used in FIG. 5 refers to geographic location of the ego vehicle at the time t1. In some embodiments, the initial location is described by the sensor data of the ego vehicle. For example, the sensor set of the ego vehicle includes a GPS unit and the GPS unit generates sensor data that describes the geographic location of the ego vehicle at the time t1. In some embodiments, the GPS unit is a standard-compliant GPS unit. In some embodiments, the geographic location of the ego vehicle at the time t1 is described with lane-level accuracy.

In some embodiments, the geographic location is determined by a localization sensor of the sensor set. An example of a localization sensor according to some embodiments includes an inertial measurement unit.

In some embodiments, the inference is made based at least in part on digital twin simulations that provide digital data regarding the inference.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for modifying an impact of latency in wireless communications between an ego connected vehicle and a remote connected vehicle, the method executed by the ego connected vehicle and comprising:

receiving a wireless message from the remote connected vehicle, wherein the wireless message includes first observation data recorded by the remote connected vehicle and describing sensor measurements of the remote connected vehicle at a first time but not a second time;

analyzing a set of vectors describing how a known object moves within a two-dimensional space to determine a two-dimensional flow of the known object in the two-dimensional space during a timespan from the first time to the second time, wherein the set of vectors is determined based on the observation data of the remote connected vehicle from the first time and sensor measurements of the ego connected vehicle at the first time and the second time;

analyzing the two-dimensional flow of the object to infer a three-dimensional flow of the object in a three-dimensional space during the timespan; and estimating, based on the three-dimensional flow of the object in the three-dimensional space, second observation data recoded by the remote connected vehicle at the second time, wherein the estimate occurs prior to receipt of the second observation data from the remote connected vehicle by the ego connected vehicle due to latency so that the impact of the latency is modified.

2. The method of claim 1, wherein the set of vectors are represented by a set of hypergraphs.

3. The method of claim 1, wherein the three-dimensional space is real-world.

4. The method of claim 3, wherein the real-world includes the ego connected vehicle, the remote connected vehicle, and the object.

5. The method of claim 1, wherein the wireless message is a cellular-vehicle-to-everything message.

6. The method of claim 1, further comprising determining a location of the object in the three-dimensional space based on the second observation data which is estimated and the sensor measurements of the ego vehicle at the second time.

7. The method of claim 6, wherein the location is accurate to within plus or minus three meters relative to an actual location of the object in the three-dimensional space.

8. The method of claim 1, wherein the ego vehicle is a hub vehicle of a vehicular micro cloud and the method improves the impact of latency among the wireless communications among members of the vehicular micro cloud.

9. The method of claim 8, wherein the hub vehicle controls membership in the vehicular micro cloud and can instruct the members when to join and when to leave the vehicular micro cloud.

10. A computer program product included in an onboard vehicle computer of an ego connected vehicle for modifying an impact of latency in wireless communications between the ego connected vehicle and a remote connected vehicle, the computer program product comprising computer code that is operable, when executed by the onboard computer, to cause the onboard computer to execute steps including:
   receiving a wireless message from the remote connected vehicle, wherein the wireless message includes first observation data recorded by the remote connected vehicle and describing sensor measurements of the remote connected vehicle at a first time but not a second time;
   analyzing a set of vectors describing how a known object moves within a two-dimensional space to determine a two-dimensional flow of the known object in the two-dimensional space during a timespan from the first time to the second time, wherein the set of vectors is determined based on the observation data of the remote connected vehicle from the first time and sensor measurements of the ego connected vehicle at the first time and the second time;
   analyzing the two-dimensional flow of the object to infer a three-dimensional flow of the object in a three-dimensional space during the timespan; and
   estimating, based on the three-dimensional flow of the object in the three-dimensional space, second observation data recoded by the remote connected vehicle at the second time, wherein the estimate occurs prior to receipt of the second observation data from the remote connected vehicle by the ego connected vehicle due to latency so that the impact of the latency is modified.

11. The computer program product of claim 10, wherein the set of vectors are represented by a set of hypergraphs.

12. The computer program product of claim 10, wherein the three-dimensional space is real-world.

13. The computer program product of claim 12, wherein the real-world includes the ego connected vehicle, the remote connected vehicle, and the object.

14. The computer program product of claim 10, wherein the wireless message is a cellular-vehicle-to-everything message.

15. A system included in an ego connected vehicle for modifying an impact of latency in wireless communications between the ego connected vehicle and a remote connected vehicle, the system comprising:
   a processor;
   a communication unit communicatively coupled to the processor; and
   a non-transitory memory communicatively coupled to the processor and the communication unit, wherein the non-transitory memory stores executable code that is operable, when executed by the processor, to cause the processor to:
      receive a wireless message from the remote connected vehicle, wherein the wireless message includes first observation data recorded by the remote connected vehicle and describing sensor measurements of the remote connected vehicle at a first time but not a second time;
      analyze a set of vectors describing how a known object moves within a two-dimensional space to determine a two-dimensional flow of the known object in the two-dimensional space during a timespan from the first time to the second time, wherein the set of vectors is determined based on the observation data of the remote connected vehicle from the first time and sensor measurements of the ego connected vehicle at the first time and the second time;
      analyze the two-dimensional flow of the object to generate an inference of a three-dimensional flow of the object in a three-dimensional space during the timespan; and
      estimate, based on the three-dimensional flow of the object in the three-dimensional space, second observation data recoded by the remote connected vehicle at the second time, wherein the estimate occurs prior to receipt of the second observation data from the remote connected vehicle by the ego connected vehicle due to latency so that the impact of the latency is modified.

16. The system of claim 15, wherein the wireless message is a cellular-vehicle-to-everything message.

17. The system of claim 15, further comprising determining a location of the object in the three-dimensional space based on the second observation data which is estimated and the sensor measurements of the ego vehicle at the second time.

18. The system of claim 17, wherein the location is accurate to within plus or minus three meters relative to an actual location of the object in the three-dimensional space.

19. The system of claim 15, wherein the ego vehicle is a hub vehicle of a vehicular micro cloud.

20. The system of claim 15, wherein the executable code is determined based at least in part on a digital twin simulation of the timespan that provides digital data for analyzing the two-dimensional flow of the object to infer the three-dimensional flow of the object in the three-dimensional space during the timespan, wherein the digital data provides the inference of the three-dimensional flow.

* * * * *